April 7, 1925.

O. C. WOODS

BOLL WEEVIL TRAP

Filed Dec. 24, 1923

INVENTOR
Owen C. Woods
BY
Adam E. Fisher
ATTORNEY

April 7, 1925.

O. C. WOODS

BOLL WEEVIL TRAP

Filed Dec. 24, 1923

Inventor
Owen C. Woods.
By Adam E. Fisher.
J.G. Attorney

April 7, 1925.
O. C. WOODS
1,532,215
BOLL WEEVIL TRAP
Filed Dec. 24, 1923
7 Sheets-Sheet 4
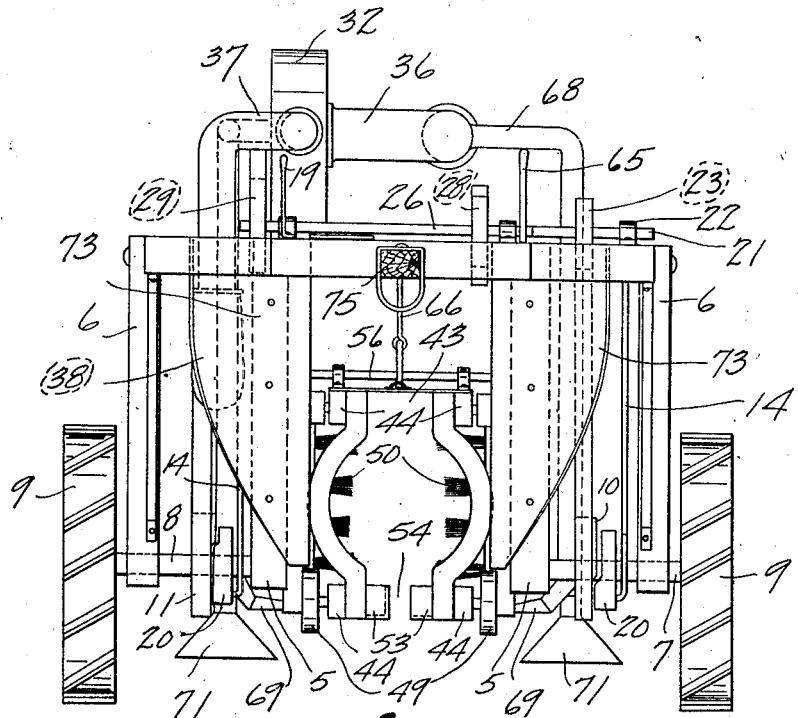
Fig. 4.
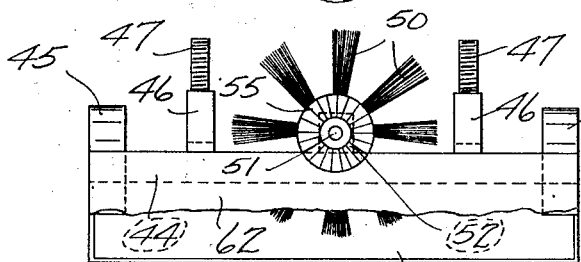
Fig. 8.
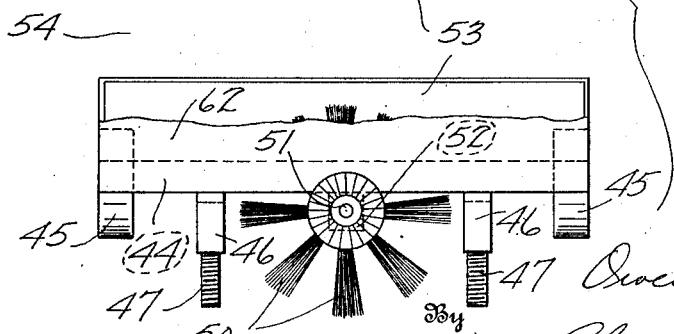

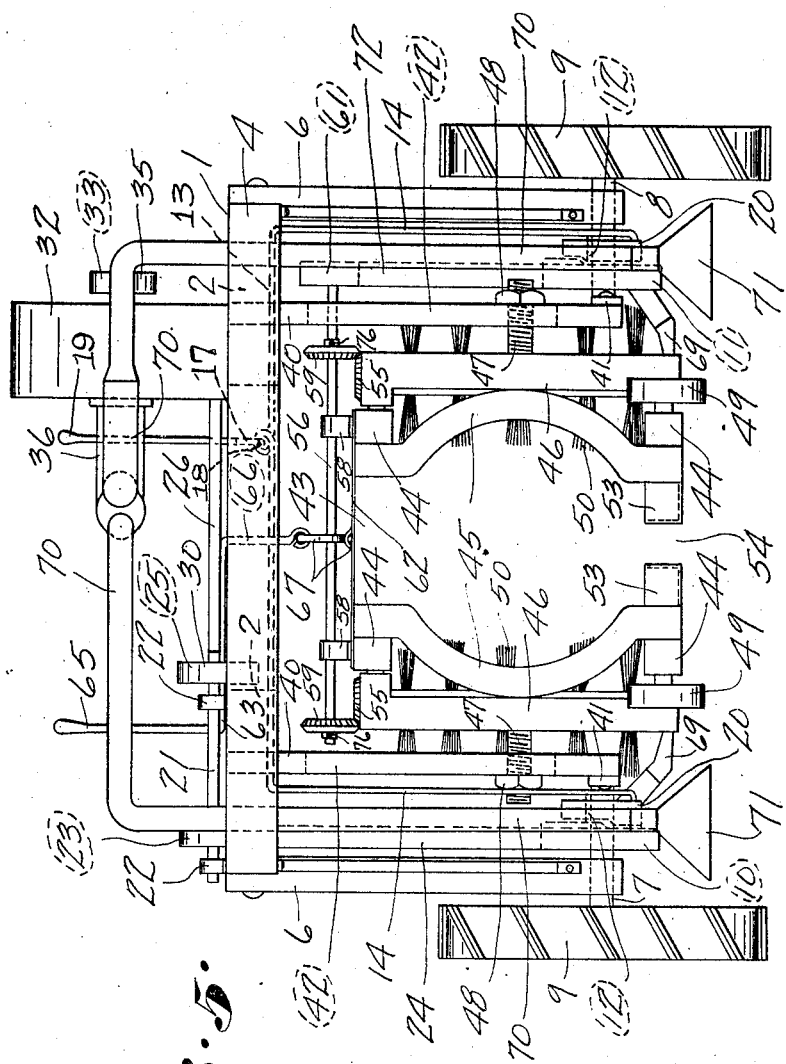

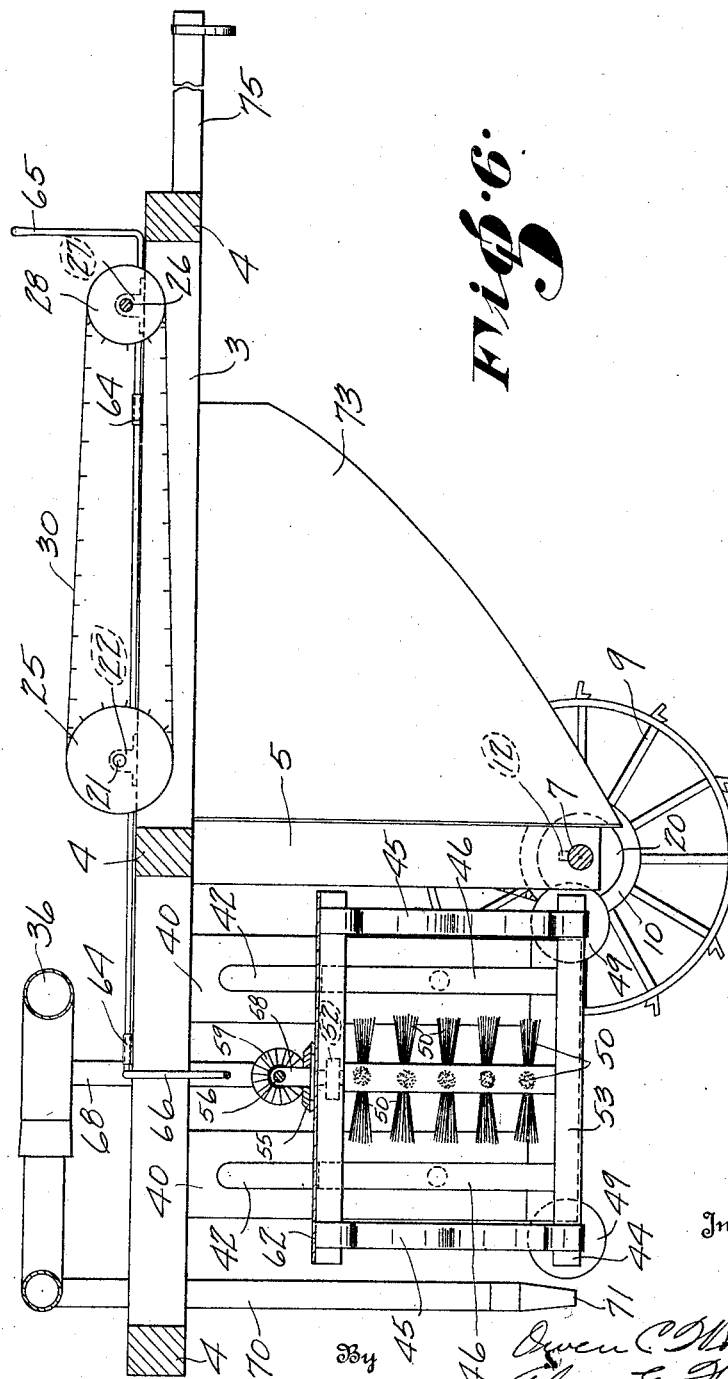

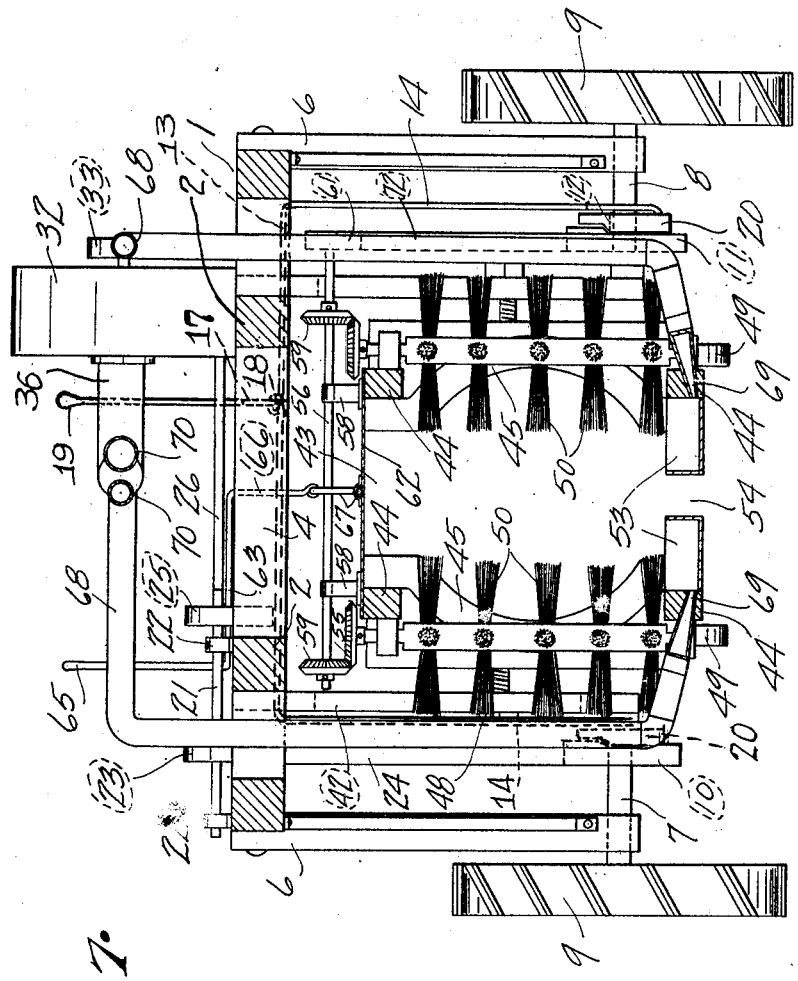

Patented Apr. 7, 1925.

1,532,215

UNITED STATES PATENT OFFICE.

OWEN C. WOODS, OF WAYCROSS, GEORGIA, ASSIGNOR OF ONE-FOURTH TO HENRY W. WILLIAMS, OF ARGYLE, GEORGIA.

BOLL-WEEVIL TRAP.

Application filed December 24, 1923. Serial No. 682,463.

*To all whom it may concern:*

Be it known that OWEN C. WOODS, a citizen of the United States, residing at Waycross, in the county of Ware and State of Georgia, has invented certain new and useful Improvements in Boll-Weevil Traps, of which the following is a specification.

This invention is in the way of a machine for exterminating boll weevils from cotton plants, and the object of the invention is to provide a relatively practical, simple and efficient machine for this purpose, embodying means for upturning the leaves, blooms and squares of the cotton plants and subjecting the under sides thereof to the action of rotary brushes for dislodging the weevils into receiving pans, and for then drawing them by air suction into a receiving sack.

In the drawing—

Figure 4 is a frontal elevation;

Figure 5 is a rear elevation;

Figure 6 is a medial, vertical, longitudinal section on the line 6—6 in Figure 1;

Figure 7 is a transverse, vertical section on the line 7—7 in Figure 1;

Figure 8 is a detail of the weevil trap.

Figure 1:
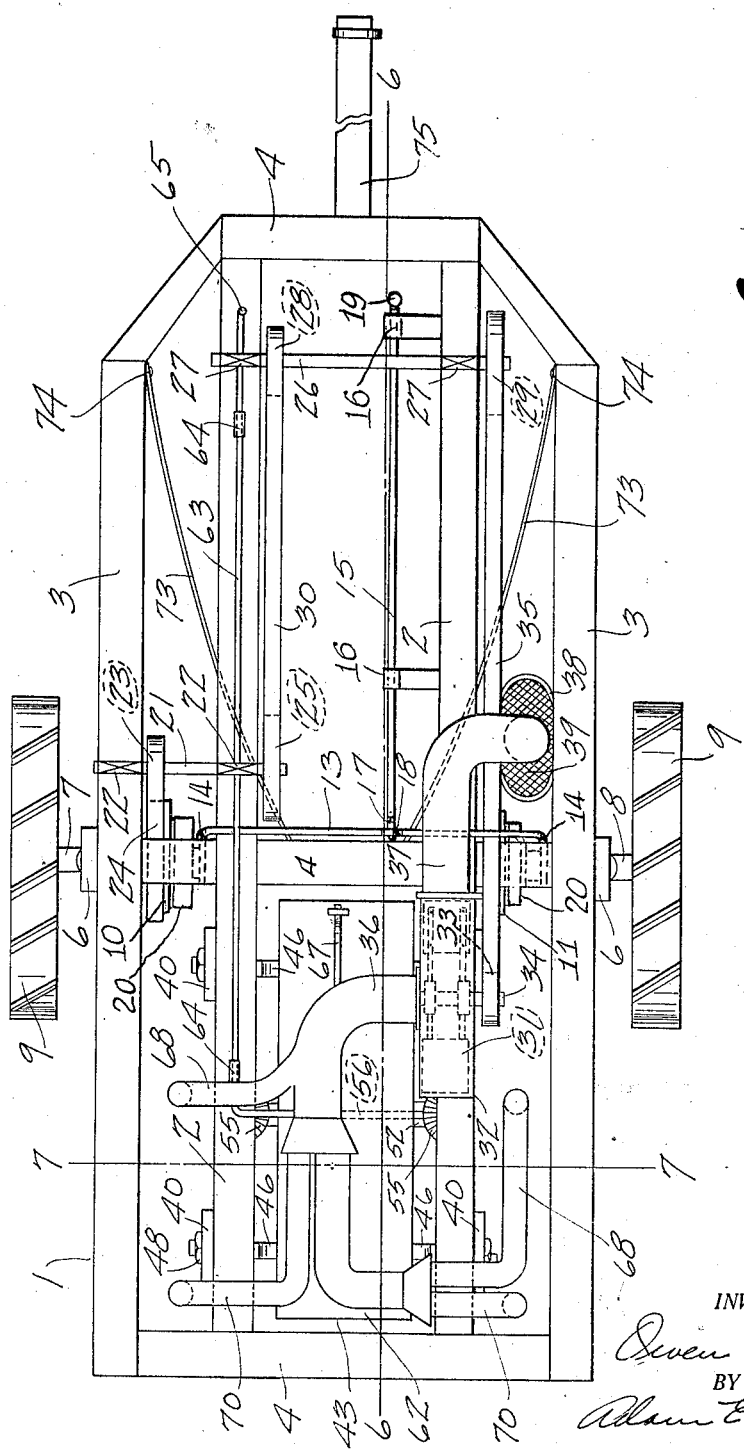
Figure 1 is a plan view of the machine.
Figure 2:
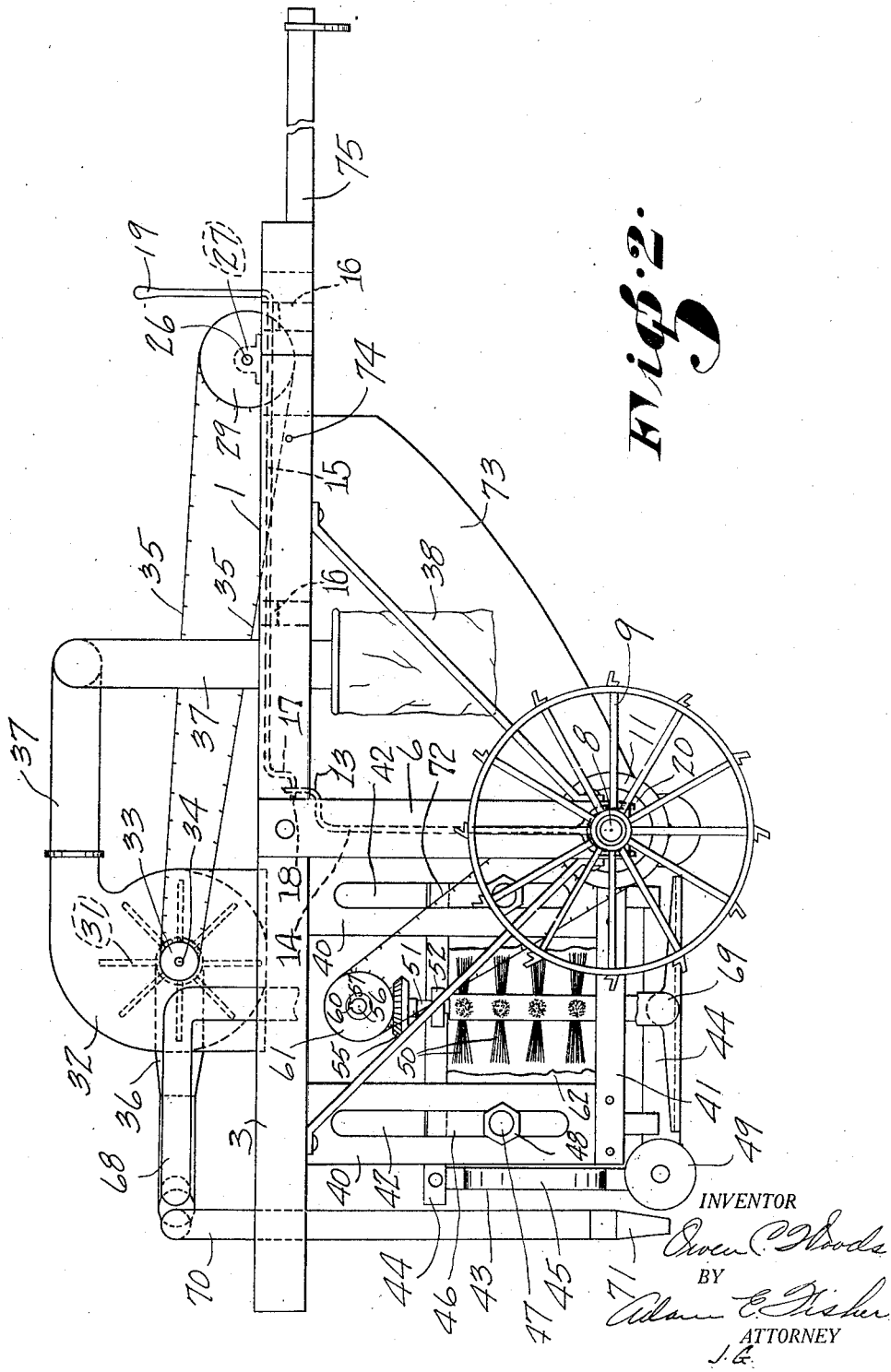
Figure 2 is a right side elevation.
Figure 3:
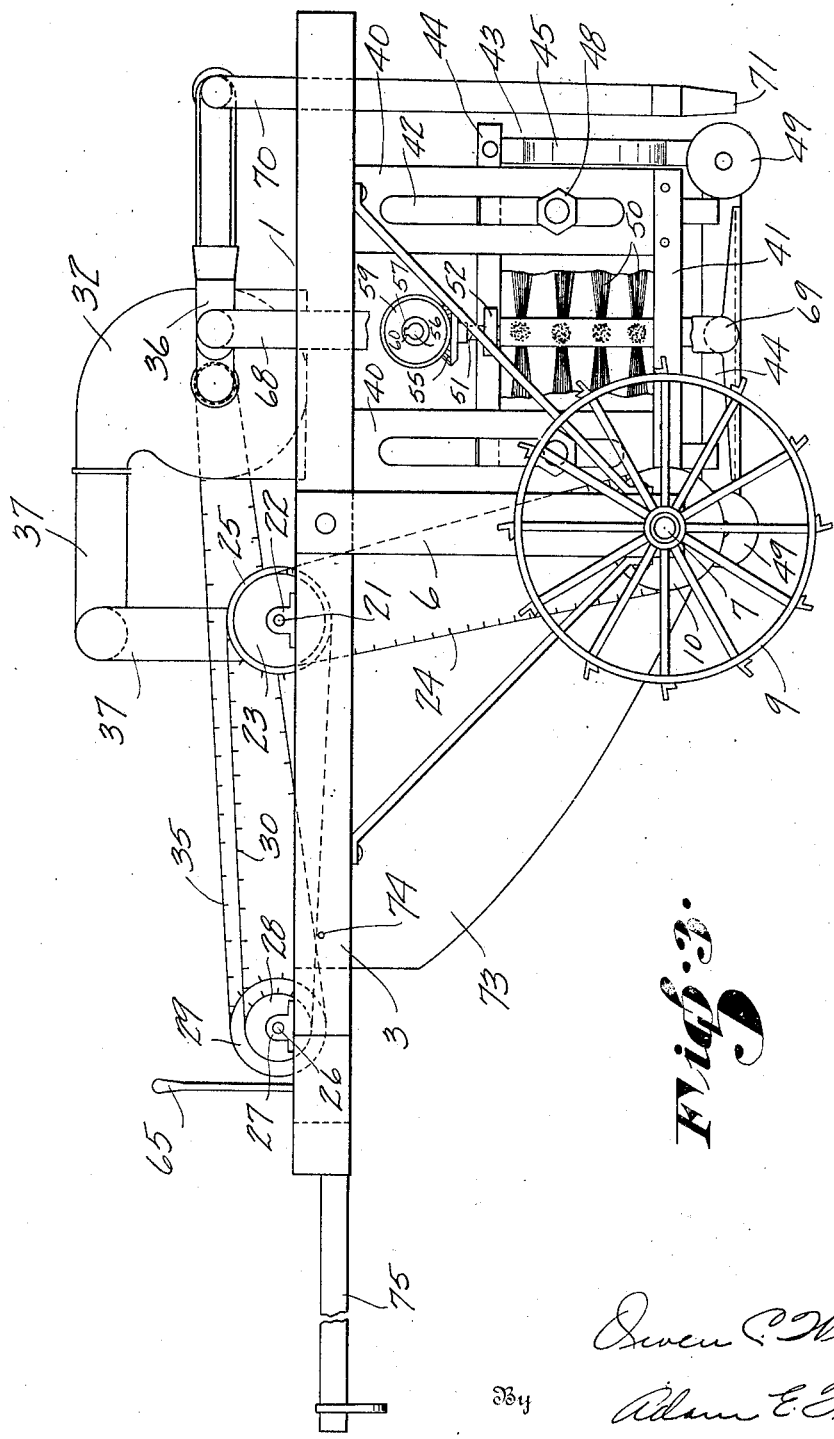
Figure 3 is a left side elevation.

In carrying out the invention, I provide a flat frame 1 having the inner longitudinal bars 2 and the outer bars 3, all arranged parallel and suitably spaced apart; and having the transverse bars 4 secured to the top upper sides thereof. Wheel stanchions 5 and 6 extend downwardly, medially from the frame 1, being secured at their upper ends to the bars 2 and 3 respectively, and being suitably braced. Jack shafts 7 and 8 are journaled through the lower ends of the stanchions 5 and 6, on the left and right hand sides of the machine, respectively, and carrying or traction wheels 9 are rigidly mounted at the outer ends of these shafts. Sprocket wheels 10 and 11 are loosely mounted on the shafts 7 and 8, respectively, between the stanchions, and clutches 20 are slidingly mounted on feathers 12 on the shafts 7 and 8 at the right sides of the sprockets 10 and 11. These clutches are controlled by the U-shaped clutch rod 13, which is set transversely a-straddle the two inner bars 2 with its ends 14 disposed at the right sides of the clutches 20. This clutch rod 13 is in turn controlled by the angular clutch lever 15 pivotally mounted to the frame at the points 16, having a finger 17 loosely connected at 18 with the rod 13, and having a handle 19 extended for the hand of the operator. By manipulation of the handle 19, the clutches 20 may be thrown to the left and so lock the sprockets 10 and 11 to rotate with the shafts 7 and 8, as the machine moves over the ground, or the clutches 20 may be thrown to the right, and disengaged from the sprockets 10 and 11, thus stopping the working elements of the machine. Across the two bars 2 and 3 at the left of the machine and above the shaft 7 is journaled a jack shaft 21 in bearings 22, and on this shaft is rigidly mounted a sprocket 23 aligned with the sprocket 10 on the shaft 7, and a sprocket chain 24 connects these two sprockets. Another sprocket 25 is rigidly mounted at the inner projecting end of the shaft 21. Forwardly on the frame 1 is transversely journaled a shaft 26 in the bearings 27, and at the ends thereof are rigidly mounted the sprockets 28 and 29, the sprocket 28 being aligned with the sprocket 25, and the two being connected by the sprocket chain 30. A suction or exhaust fan 31 is mounted in the housing 32 on top of the frame 1, the fan being operated by a sprocket 33 on the extended end of the fan shaft 34. The sprocket 33 is positioned outside the housing 32 and in alignment with the sprocket 29, the two being connected by the sprocket chain 35. A suction pipe 36 is connected to the housing 32 at the suction side of the fan, and a blow pipe 37 at the opposite side of the housing, the blow pipe 37 connecting with the receiving sack 38 through a screen 39 therein.

Underneath the back end of the frame 1 are rigidly mounted hangers 40, there being two at each side and spaced apart. The lower ends of the two hangers at each side are joined by straps 41. These hangers 40 are slotted vertically as shown at 42. A weevil-trap 43 is adjustably mounted within the hangers 40. This trap is made up of two open side frames 44 having semicircular end pieces 45 with the concave faces turned toward each other, and so as together to form an approximate circular opening through the trap as a whole. The frames 44 are located longitudinally within the hangers 40 and are adjustably supported in place by braces 46, having threaded fingers 47 extended out through the slots 42. Two adjustment nuts 48 are then mounted on each finger, one on either side of the hanger 40, and thus the frame as a whole may be readily raised or lowered vertically in the slots 42, or may be moved together or drawn apart laterally. Caster wheels 49 are mounted at the front and back of the side frames 44. Rotary brushes 50 have their shafts 51 journaled vertically in bearings 52 on the side frames 44, and so that the brushes will rotate and extend somewhat into the interior of the trap. Weevil pans 53 are mounted inwardly along the bottom edges of the side frames 44, the inner edges of these pans being extended medially toward and parallel to each other, but with the central plant-way 54 left between them. The upper ends of the shafts 51 are extended through the bearings 52, and bevel gears 55 are rigidly mounted on these extended ends. A drive shaft 56, having a feather or key 57, is journaled through bearings 58, mounted one on each of the side frames 44, and bevel gears 59, having key slots 60, are adjustably mounted on the shaft 56, with the key slots 60 engaging the feather 57. The gears 59 are adapted to mesh with the gears 55, and may be locked at any point on the shaft 56 by set screws 76 passed through their hubs. A sprocket 61 is rigidly mounted on the right hand end of the shaft 56, and in alignment with the sprocket 11 on the shaft 8, and these sprockets are then connected by a sprocket chain 72. The adjustable gears 59 provide for the lateral moving together or apart of the side frames 44. Flexible coverings 62 are mounted on the frames 44 between the top edges of the frames 44, thus completing the weevil trap 43. The trap 43 may be raised bodily by the operator by means of an angular lever 63 pivotally attached to the frame 1 at the points 64, and having an angularly extended handle 65, and an angularly extended lifting arm 66 disposed over the trap 43 and loosely connected therewith by the links 67.

Branches 68 from the suction pipe 36 are extended to and connected with the weevil trap 43, through hollow connections 69 piercing the side frames 44 immediately above the weevil pans 53 and under the lower ends of the rotary brushes 50. Other branch pipes 70 extend to hollow connections 71 at the rear of the side frames 44, and so are adapted to pick up any weevils and all fallen squares which may fall to the ground through the plant-way 54. Wings 73 are flaringly set at the front of the machine, they being arranged vertically and having their inner edges attached to the stanchions 5, while their outer or forward edges are attached upwardly at the points 74 on the outer bars 3. A tongue 75 is mounted in the forward end of the device, for the purpose of drawing the machine with horses; or it may be drawn and operated by a tractor; or horses or tractor may be employed to draw the machine over the ground while the mechanism is operated by separate motive power.

In operation, the machine is drawn forward a-straddle the row of cotton plants, and these plants are directed by the wings 73 into and through the weevil trap 43, the stalks of the plants traveling through the plant-way 54. In this operation, the leaves of the plants are bent over forwardly as the tops of the plants come in contact with the top of the trap 43, and the under sides of the leaves and blooms and squares are then acted upon by the rotary brushes 50, which brush off the weevils into the pans 53. It appears that the boll weevil generally attach themselves to the under sides of the leaves and blooms and squares of the cotton plants. The fan 31 causes a strong suction through the pipes 36, 68 and 70, which draws the insects up therethrough, and through the fan housing 32, and out through the pipe 37 into the sack 38. The traction wheels 9 furnish the power for driving the working elements of the machine, through the sprockets, chains and gears enumerated. The machine as described constitutes what may be termed a one-unit machine, adapted for treating one row of plants at a time. It is obvious that the machine may readily be widened so as to include two or more rows, if desired.

While I have herein set forth a specific manner and method of constructing and assembling the various elements of my invention, it is understood that I may vary from the same in minor details, not departing from the spirit of my invention, as defined in the appended claim. For example the working parts may me operated by belts and pulleys as well as by sprockets and chains.

I claim:

A machine of the kind described, comprising in combination a wheel-borne frame; an exhaust fan in a housing on the frame; slotted hangers under the back end of the frame; a weevil trap adjustably mounted between said slotted hangers, the same including open side frames having threaded fingers with adjustment nuts thereon engaging the slotted hangers, rotary brushes mounted through the side frames, and weevil pans on the side frames under the brushes, there being a plant-way left between the weevil pans; means for directing the plants through the said plant-way between the weevil pans; pipes connecting the weevil trap with the exhaust fan; and means for driving the exhaust fan and the rotary brushes by the power furnished by the wheels.

In testimony whereof I affix my signature.

OWEN C. WOODS.

Witnesses:
 Mrs. J. W. Proctor,
 Vela Miller.